United States Patent [19]

FitzGerald et al.

[11] 4,211,691

[45] Jul. 8, 1980

[54] THERMOPLASTIC POWDER COATING SYSTEMS

[75] Inventors: Emerson B. FitzGerald, Wilmington, Del.; Walter C. Meyer, Lake Orion, Mich.

[73] Assignee: E. I. Du Pont de Nemours and Company, Wilmington, Del.

[21] Appl. No.: 957,915

[22] Filed: Nov. 6, 1978

Related U.S. Application Data

[63] Continuation of Ser. No. 771,066, Feb. 23, 1977, abandoned, which is a continuation-in-part of Ser. No. 576,633, May 12, 1975, abandoned, which is a continuation-in-part of Ser. No. 405,627, Oct. 11, 1973, abandoned.

[51] Int. Cl.$^2$ .............................................. C08L 63/10
[52] U.S. Cl. ........................... 260/42.21; 260/42.22; 260/42.28; 260/42.43; 260/42.48; 260/42.49; 260/42.52; 525/191; 525/203; 525/208; 525/213; 525/218; 525/221
[58] Field of Search ............... 260/836, 837, 42.28, 260/42.21, 42.22, 42.43, 42.48, 42.49, 42.52, 859, 875, 884, 885, 886

[56] References Cited

U.S. PATENT DOCUMENTS

| | | | |
|---|---|---|---|
| 3,390,206 | 6/1968 | Thompson | 260/875 |
| 3,532,530 | 10/1970 | Denison et al. | 260/42.43 |
| 3,752,870 | 8/1973 | Labana | 260/836 |

*Primary Examiner*—James H. Derrington

[57] ABSTRACT

A thermoplastic powder coating composition is provided, comprising particles of polymeric material comprising a mixture of polymer (A) and polymer (B), polymer (A) and polymer (B) being selected from the group consisting of polymer of ethylenically unsaturated monomer, alkyd, polyester, and polyester urethane, one of either polymer (A) or polymer (B) containing an average of about 0.9–1.1 reactive groups per molecule and the other of polymer (A) or polymer (B) containing an average of 1–10 reactive groups per molecule, the reactive groups on polymer (A) being coreactive in a condensation reaction with the reactive groups on polymer (B), and polymer (A) and polymer (B) are compatible.

3 Claims, No Drawings

THERMOPLASTIC POWDER COATING SYSTEMS

CROSS-REFERENCE TO RELATED APPLICATION

This application is a continuation of application. Ser. No. 771,066, filed Feb. 23, 1977, now abandoned, which is a continuation-in-part of application Ser. No. 576,633 filed May 12, 1975, now abandoned, which is a continuation-in-part of application, Ser. No. 405,627 filed Oct. 11, 1973, now abandoned.

BACKGROUND OF THE INVENTION

There has been substantial research to develop powder coating paint systems. One reason for this is to eliminate the need for organic liquid carrier for the film-forming polymer which when vaporized may cause pollution problems.

As is known by those skilled in the art, with a powder coating system, particles of polymer are applied to a substrate such as by spraying. Often the particles are caused to adhere to the substrate by suitable means, such as by imparting an electrostatic charge to the particles of polymer. Afterwards, the particles of polymer are caused to coalesce by suitable means such as by baking.

One of the problems that has been encountered in existing powder coating systems is that if the particles of polymer are of low enough molecular weight that they will flow and coalesce when baked, the resulting baked paint film may not have acceptable toughness. One solution of this problem has been through the use of thermosetting powder coating systems. Such systems, however, once baked, are no longer suitable in applications requiring subsequent flow.

SUMMARY OF THE INVENTION

According to the present invention there is provided:

A thermoplastic powder coating composition comprising particles of polymeric material comprised of a mixture of polymer (A) and polymer (B), polymer (A) and polymer (B) being selected from the group consisting of polymer of ethylenically unsaturated monomer, alkyd, polyester and polyester urethane, one of either polymer (A) or polymer (B) containing an average of about 0.9-1.1 reactive groups per molecule and the other of polymer (A) or polymer (B) containing an average of 1-10 reactive groups per molecule, the reactive groups on polymer (A) being co-reactive in a condensation reaction with the reactive groups on polymer (B) and polymer (A) and polymer (B) are compatible.

It has been found that when the particles of polymeric material are baked, polymer (A) and polymer (B) will react with each other to form a thermoplastic condensation polymer of higher molecular weight than that of the starting materials polymer (A) or polymer (B) and which has a substantial absence of crosslinking. Such condensation polymer has the toughness needed in the final paint film and can re-flow upon heating. Before polymer (A) and (B) have reacted with each other to cause the viscosity to increase to a substantial degree, however, the heat of the baking allows the particles of polymer to melt, flow out and coalesce, thereby resulting in a smooth paint film with good aesthetics.

DESCRIPTION OF THE INVENTION

General Description of Polymer (A) and Polymer (B)

Generally, polymer (A) and polymer (B) should have a low enough glass transition temperature to allow the particles comprised of them to melt, flow out and coalesce at the prevalent baking conditions. Often polymer (A) and polymer (B) will have a glass transition point of about 20° to 115° C., preferably about 25° to 75° C. and more preferably, about 45° to 75° C.

Generally, polymer (A) and polymer (B) should have a molecular weight such that when polymer (A) and polymer (B) react with each other, the thermoplastic condensation polymer so produced will have a weight average molecular weight of about 40,000-200,000 and preferably about 60,000-130,000. Often polymer (A) and polymer (B) will have a weight average molecular weight of about 5,000-180,000, and preferably 5,000-100,000.

One of either polymer (A) or polymer (B) should contain an average of at least one reactive group per molecule and the other of either polymer (A) or polymer (B) should be substantially monofunctional, which for the purposes of this invention is defined to be a polymer that contains an average of about 0.5-1.3, preferably about 0.9-1.1 reactive groups per molecule. Under these most preferable conditions, the product of polymer (A) with polymer (B) can be substantially uncrosslinked. This means that the final coating is substantially thermoplastic and is capable of subsequent reflow in certain applications.

Preferably, the number of reaction groups contained in the either of polymer (A) or polymer (B) that contains at least about 1 reactive group per molecule should be about 1-20, preferably about 1-10 and most preferably, about 2-5. There should be present a sufficient number of equivalents of the substantially monofunctional polymer to theoretically react with at least about 50% of the reactive groups of the other polymer.

The following are examples of pairs of co-reactive groups:
carboxyl—with epoxy
carboxyl—with isocyanate
carboxyl—with hydroxyl
carboxyl—with aziridinyl
acid anhydride—with hydroxyl
acid chloride—with hydroxyl
acid chloride—with amine
isocyanate—with hydroxyl
amine—with epoxy Preferred is the reaction of carboxyl with epoxy.

If desired, the particles of polymeric material comprised of a blend of polymer (A) and polymer (B) can contain a catalyst that will promote the reaction of the compatible reactive groups. Examples of this are quaternary ammonium salts or tertiary amines of high enough molecular weight that they do not appreciably volatilize during bake (such as dimethyl benzyl amine, dimethyl lauryl amine or HCl salts of the foregoing) which serve as a catalyst for the reaction of carboxyl groups with hydroxyl groups. Another example is p-toluene sulfonic acid as a catalyst for the reaction of carboxyl groups with hydroxyl groups.

Generally, the co-reactive groups should be substantially non-reactive at ambient temperatures but substantially reactive (taking into account any catalyst that is used) during the baking conditions.

Polymer (A) and polymer (B) must be quite similar to each other for operability of this invention. In order to be able to obtain a clear polymer solution of even a single polymer prepared by solution polymerization, the presence of polymer molecules having graduated molecular weights and compositions is required to provide sufficient overlap for compatibility. Compatibility of polymers (A) and (B) can be insured when, e.g., the esters of acrylic acid or methacrylic acid with alkanols of $C_{1-18}$, which form the non-reactive portions of the two polymers, are substantially the same, and are present in substantially the same proportions, in both polymers (A) and (B).

Example 1, for example, illustrates this principle and shows an epoxy-containing polymer having a composition of methyl methacrylate/butyl methacrylate/glycidyl methacrylate//73/24/3 (by weight), weight average molecular weight of about 70,000, and $T_g$ of 80° C. This polymer is closely matched by the monocarboxyl polymer having a composition of methyl methacrylate/butyl methacrylate/acid (from initiator)//74/25/1 (by weight), weight average molecular weight of about 60,000 and a $T_g$ of 80° C.

Polymer compatibility is usually indicated by the miscibility of the solutions of the polymers involved.

Polymers of Ethylenically Unsaturated Monomer

Suitable ethylenically unsaturated monomers for forming polymer of ethylenically unsaturated monomer includes $C_1$–$C_{18}$ esters, amides and nitriles of acrylic and methacrylic acids; styrene and alkyl styrene, $C_1$–$C_{18}$ vinyl esters, etc., and mixtures of the foregoing.

Specific monomers for forming polymers of ethylenically unsaturated monomer include esters of acrylic acid with alkanols having about 1 through 18 carbon atoms, such as methyl acrylate, ethyl acrylate, propyl acrylate, isopropyl acrylate, the various butyl acrylates, cyclohexyl acrylate, 2-ethylhexyl acrylate, n-hexyl acrylate, n-octyl acrylate, t-octyl acrylate, dodecyl acrylate, hexadecyl acrylate, octadecyl methacrylate, and the like; esters of methacrylic acid with alkanols having about 1 through 18 carbon atoms, such as methyl methacrylate, ethyl methacrylate, propyl methacrylate, isopropyl methacrylate, the various butyl methacrylates, cyclohexyl methacrylate, n-hexyl methacrylate, 2-ethylhexyl methacrylate, n-octyl methacrylate, t-octyl methacrylate, dodecyl methacrylate, hexadecyl methacrylate, octadecyl methacrylate and the like; vinyl esters of fatty acids having about 2 through 20 carbon atoms such as vinyl acetate, vinyl propionate, vinyl butyrate, vinyl valerate, vinyl hexanote, vinyl octoate, vinyl α,α-dimethyloctoate, vinyl oleate, vinyl laurate, vinyl palmitate, vinyl stearate, and the like; styrene, chloroprene, vinyl chloride, vinylidene chloride, acrylonitrile, butadiene, 1-butene, methacrylonitrile, vinyl toluene, chlorostyrene, dichlorobutadiene, ethylene, propylene, isobutene, and

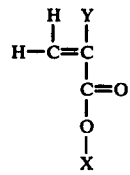

wherein Y=—H, —$CH_3$ or —$CH_2CH_3$ and

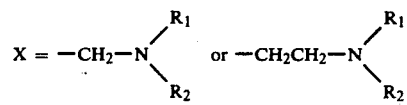

wherein $R_1$ and $R_2$ are H or $C_1$–$C_4$ alkyl.

Preferred are methyl acrylate, ethyl acrylate, propyl acrylate, isopropyl acrylate, the various butyl acrylates, 2-ethylhexyl acrylate, methyl methacrylate, ethyl methacrylate, propyl methacrylate, isopropyl methacrylate, the various butyl methacrylates, 2-ethylhexyl methacrylate, vinyl acetate, styrene, vinyl chloride, acrylonitrile, butadiene, 1-butene, methacrylonitrile, vinyl toluene, chlorostyrene, ethylene, propylene, and isobutene. Mixtures of the foregoing can be used.

Reactive groups can be incorporated in the polymer of ethylenically unsaturated monomers by polymerizing ethylenically unsaturated monomers with ethylenically unsaturated monomer(s) containing reactive groups. Suitable ethylenically unsaturated monomers containing reactive groups include acrylic acid, methacrylic acid, itaconic acid, maleic anhydride, crotonic acid, allyl alcohol, hydroxyethyl acrylate, hydroxypropyl methacrylate, vinyl alcohol, 2-isocyanatoethyl methacrylate, glycidyl methacrylate, aziridinyl methacrylate, methacryl chloride, and ethacryl chloride.

The polymers of ethylenically unsaturated monomers are formed by conventional free-radical polymerization techniques that are well known. Generally, any free-radical initiator that can be used for bulk, solution, emulsion, or dispersion polymerization of the monomers herein enumerated can be employed. Ordinarily, free radical initiators of the azo or peroxygen types will be used. Examples include benzoyl peroxide, lauroyl peroxide, acetyl peroxide, cumene hydroxyperoxide, paramenthane hydroperoxide, dimethyl azobis-isobutyrate, azobis(isobutyronitrile), and the like. The catalyst will be used in ordinary amounts which often will be about 0.05-3% by weight of total monomer.

Often, to produce the polymers of ethylenically unsaturated monomers, the monomers and free-radical initiator along with a suitable organic liquid are placed in a reaction vessel. Sufficient heat is applied to maintain the mixture at its reaction temperature which often will be in the range of 30°-150° C. until the reaction is complete which often will take about ½ to 24 hours. Preferably, a dispersion or solution polymerization system will be used.

To produce a polymer of ethylenically unsaturated monomer having only one terminal reactive group per molecule, one can use the method described in U.S. Pat. No. 3,390,206, issued June 25, 1968 in the name of M. R. Thompson and F. A. Waite, the disclosure of which is hereby incorporated by reference.

Polymer of ethylenically unsaturated monomers containing reactive groups such as carboxylic acid chloride, isocyanate, and epoxide, although they can be produced directly, can be produced by suitable reactions with a polymer of ethylenically unsaturated monomer containing hydroxyl or carboxyl groups. For example, polymers of unsaturated monomers containing isocyanate groups can be produced by reacting polymer of unsaturated monomers containing OH or COOH groups with a diisocyanate or an alkylene imine such as ethylene imine or propylene imine.

Alkyd Resins

Any of the conventional alkyd resins used in baking type coating compositions can be used in this invention. These resins are usually prepared by heating together a polycarboxylic acid component, a polyol component, and an oil component with or without solvent at a temperature of less than about 300° C. and preferably, about from 180° to 250° C. until an alkyd resin having the desired properties is obtained. Typically, such alkyd resins have an oil length of about 30 to 60%, an acid number of less than about 10, and 2% to 8% of unreacted hydroxyl. "Oil length" is a term used to describe the amount of oil in the resin and equals the percent by weight of fatty oil acid calculated as triglyceride (monocarboxylic acidglyceride) used in preparing the resin. As is conventional in the coating art, the unreacted hydroxyl and oil length are based on glycerol whether or not glycerol is used as the polyol. The acid number is the number of milligrams of potassium hydroxide necessary to neutralize the acidity of one gram of alkyd resin.

Polycarboxylic acids, such as, for example, oxalic acid, malonic acid, succinic acid, glutaric acid, sebacic acid, adipic acid, pimelic acid, suberic acid, azelaic acid, citric acid, tartaric acid, maleic acid, phthalic acid, terephthalic acid, itaconic acid, citraconic acid, and mixtures thereof can, among others, be used in preparing the alkyd resins employed in the invention. Of course, any of the anhydrides of the aforementioned acids can be used in equivalent amounts in place of the acids. Phthalic acid or anhydride is a preferred constituent of the polycarboxylic acid component.

Typical polyols useful in preparing the alkyl resin are, for example, ethylene glycol, diethylene glycol, dimethylene glycol, tetramethylene glycol, pinacol, trimethylol propane, trimethylol ethane, mannitol, sorbitol, glycerol, pentaerythritol, and mixtures thereof. Glycerol is a preferred polyol.

Illustrative oil components are, for example, drying oils, such as dehydrated castor oil, tung oil, oiticica oil, linseed oil, and perilla oil; semi-drying oils, such as soybean oil, menhanden oil, cod liver oil, and olive oil; fatty acids derivable from the aforementioned oils, such as linolenic, linoleic, palmitolic and oleic acids; and mixtures thereof. Materials such as tall oil, and tall oil fatty acids can also be used with or in place of the aforementioned oils and fatty acids. Preferably, non-drying oil should not be used as the sole constituent of the oil component since they often by themselves do not form hard, durable coatings.

Of course, alkyd resins can be produced that contain OH or COOH groups by varying the ratios of the carboxylic and hydroxyl containing reactants. In a manner similar to that described for the polymers of unsaturated monomers, alkyd resins containing carboxylic acid chloride, isocyanate, epoxy, amine groups, etc., can be produced by reating suitable compounds with the alkyd resin containing —COOH or —OH groups.

Polyesters

The polyesters can be produced by (1) an esterification reaction, i.e., the reaction of one or more diols or polyether glycols with one or more dicarboxylic acids (or equivalents thereof such as anhydrides or acid chlorides of dicarboxylic acids) or (2) by a transesterification reaction, i.e., the reaction of one or more diols or polyether glycols with one or more esters of dicarboxylic acids.

The polyesters can be produced by conventional techniques which are well known, such as a hot melt reaction or reaction in solvent media. Ordinarily, the reactants will be admixed in a suitable reaction vessel, with heating to a temperature of about 150° C.–250° C. for ½–8 hours to produce the polyester.

The diols can be aliphatic or aromatic. The hydrocarbon radicals in the diols can contain, be substituted with or interrupted with non-interfering groups, such as N, O, S, halogen, and the like. Suitable diols include: ethylene glycol, propylene-1,2-glycol, propylene-1,3-glycol, butylene-1,3-diol, butylene-1,4-diol, butylene-2,3-diol, neopentylglycol, i.e., 2,2-dimethylpropane-1,3-diol, 2,2-diethylpropane-1,3-diol, 2-methyl-2-propylpropane-1,3-diol, decamethylene glycol, dodecamethylene glycol, thioethylene glycol, N-methyl diethanolamine, monoethyl ether of glycerine, $\alpha,\beta$-allyl ether of glycerol, and the like.

Preferably, the diols will have about 2–10 carbon atoms, more preferably, about 2–8 carbon atoms, and most preferably, about 2–6 carbon atoms.

A preferred diol is ethylene glycol.

If desired, one or more polyether glycols can be used with the diols. Suitable polyether glycols include polytetramethylene ether glycol, polyethylene glycol, polypropylene glycol, diethylene glycol, and the like. Such polyether glycols can have a molecular weight of about 200–10,000, preferably about 500–4,000, and most preferably, about 1,000. A preferred polyether glycol is polytetramethylene ether glycol.

The dicarboxylic acids can be aliphatic, cycloaliphatic, unsaturated or aromatic. The hydrocarbon radicals in the dicarboxylic acids can contain, be substituted with, or be interrupted by non-interfering groups such as O, S, N, halogen, keto, and the like. Suitable dicarboxylic acids include: malonic, succinic, glutaric, adipic, pimelic, suberic, azelaic, sebacic, brassylic, maleic, fumaric, dilinoleic, diphenic, tetrachlorophthalic, isophthalic, terephthalic, orthophthalic, cyclohexane dicarboxylic, p-phenylene diacetic, naphthalene dicarboxylic, dihydromuconic, $\beta$-methyl adipic, trimethyl adipic, and ethylether-2,2'-dicarboxylic acids, and the like.

If desired, one can use anhydrides of the above dicarboxylic acids, such as phthalic anhydride, tetrahydrophthalic anhydride and the like. A preferred dianhydride is phthalic anhydride. If desired, one can use acid chlorides of the above dicarboxylic acids.

Preferred dicarboxylic acids include terephthalic acid, isophthalic acid, orthophthalic acid, azelaic acid, adipic acid, and a mixture of $C_4$–$C_6$ aliphatic dicarboxylic acids.

Preferably, the dicarboxylic acids or anhydrides of dicarboxylic acids will have about 4–12 carbon atoms.

Polyesters can be made that are hydroxyl terminated or —COOH terinated depending on the ratio of the dicarboxylic acids or diols that are used in the reaction to produce the polyester. Polyesters containing an average of one hydroxyl group per molecule can be produced by initiation of the polymerization reaction with an anion such as methoxide (for example, sodium methoxide).

In a manner similar to that described for the polymers of unsaturated monomers, polyesters containing carboxylic acid chloride, isocyanate, epoxy, amine, etc., can be produced by reacting suitable compounds with polyesters containing —COOH or —OH groups.

Ordinarily, the polyester will have a molecular weight of about 500 to about 100,000.

Polyester Urethanes

The polyester urethanes can be produced by (A) admixing at least one linear polyester having terminal hydroxyl groups, with (B) at least one organic diisocyanate, the molar ratio of isocyanate (contained on the diisocyanate) to nydroxyl (contained on the polyester) being about 7/10 to about 1/1, at a temperature and for a time sufficient to form a hydroxyl terminated polyester-urethane.

The polyesters are those previously described.

The diisocyanates for use in this invention can be aliphatic or aromatic. Suitable isocyanates include: hexane-1,6-diisocyanate, decane-1,10-diisocyanate, diisocyanates derived from dimerized fatty acids, phenylene-1,4-diisocyanate, toluene-2,4-diisocyanate, toluene-2,6-diisocyanate, naphthylene-1,5-diisocyanate, diphenylmethane-4,4'-diisocyanate, diphenylmethane-3,3'-dimethoxy-4,4'-diisocyanate, dicyclohexylmethane-4,4'-diisocyanate, etc.

Preferred is toluene-2,4-diisocyanate, toluene-2,6-diisocyanate or mixtures thereof and isophorone diisocyanate.

The polyester-urethane should have about 2 hydroxyl groups per molecule, that should be hydroxyl terminated.

The polyester-urethane is prepared by admixing polyester and diisocyanate in a suitable reaction vessel at a temperature and for a time sufficient for the polyester-urethane to be formed. If desired, a catalyst can be used such as trimethylpyridine, N-ethyl morpholine, diazabicyclo-(2,2,2)-octane or organic metal compounds (for example dibutyl tin dilaurate).

The reaction time can vary somewhat depending upon the reactivity of the diisocyanate used and whether or not a catalyst is used. Generally, however, the reaction time will be between about ¼ and 8 hours. The reaction temperature can be between about 40° C. and 180° C.

The molar ratio of isocyanate (contained on the diisocyanate) to hydroxyl (contained on the above-described polyester) should be about 0.7/1.0 to about 1.0/1.0, preferably 0.75/1.0 to 0.90/1.0 and most preferably 0.80/1.0 to 0.85/1.0 Because of this ratio of isocyanate to hydroxyl, the polyester-urethane will contain little or no free isocyanate groups.

It is often desirable to have the reaction between the polyester and the diisocyanate take place in the presence of a suitable organic solvent. Suitable solvents include aromatic hydrocarbons, such as toluene, xylene, tetrahydronaphthalene, decahydronaphthalene, etc.; chlorinated hydrocarbons such as methylene chloride, chloroform, dichloroethane, trichloroethane; ethers such as diisopropyl ether, tetrahydrofuran, dioxane, ethylene glycol dimethyl ether, etc.; esters such as ethyl acetate, butyl acetate, etc.; ketones such as acetone, methyl ethyl ketone, methyl isobutyl ketone, cyclohexanone, etc.

In a manner similar to that described for the other polymers, one can produce polyester-urethanes that contain carboxylic acid, carboxylic acid chloride, isocyanate, epoxy, etc., by reacting hydroxyl terminated polyester-urethanes with suitable compounds that contain such reactive groups.

Pigment

The particles of polymeric material can contain pigment.

Pigment can be present in an amount at or up to the critical pigment volume (that level of pigmentation where just sufficient polymer is present to fill the voids between the pigment particles). Often pigment will be present in an amount of about 0.5% to about 60% by volume (based on combined volume of the pigment and polymer (A) and polymer (B)).

Examples of suitable pigment include titanium dioxide, iron oxide, lead chromate, chromium oxide, phthalocyanines, carbon black, zinc oxide, magnesium oxide, antimony oxide, lithopone, zinc chromate, red lead, metal powder or flake (such as aluminum, nickel, copper, bronze, and the like), zinc stearate, aluminum stearate, glass microbubbles, aluminum silicate, magnesium silicate, calcium sulfate, barium sulfate, silicon dioxide, potassium aluminum silicate, calcium carbonate, magnesium silicate, calcium silicate, amorphous silica, mica, bentonite, asbestos, or mixtures of the foregoing.

Preparation of Particles

The particles of polymeric material can be made by any suitable method.

One suitable method is to form a solution of polymer (A) and polymer (B) in organic liquid and then spray dry the solution to produce the particles of an intimate blend of polymer (A) and polymer (B). Such method requires that the polymers be compatible with each other.

Suitable organic liquids include naphthenes, gasoline, aromatic hydrocarbons, aliphatic hydrocarbons, halogenated hydrocarbons, alcohols, esters, ethers, and ketones. Examples of specific organic liquids include pentane, n-hexane, cyclohexane, n-heptane, n-octane, isooctane, benzene, xylene, mineral spirits, gasoline, terpenes, solvent naphthas of aromatic aliphatic or naphthenic character, VM and P naphtha, alkyl benzenes wherein the alkyl group or groups have from 1 to 4 carbon atoms, octane isomers, petroleum ethers, chloroform, carbon tetrachloride, chlorobenzene, acetone, methyl ethyl ketone, methyl isobutyl ketone, ethyl acetate, butyl acetate, ethylene glycol monoethyl ether acetate, diethylene glycol monobutyl ether acetate, ethanol, isopropanol, butyl alcohol, cyclohexanol, diacetone alcohol, 2-ethylhexanol, or mixtures of any of the foregoing.

Another suitable method is to cast a film of a blend of polymer (A) and polymer (B) and then break up the film into small particles such as by grinding.

Still another suitable method is to admix the polymers in a hot melt and then allow the hot melt to harden. Afterwards the hardened mixture of polymer can be broken up into small particles by any suitable method such as grinding.

Often the particles of this invention will have an average diameter of about 1–300 microns, preferably about 5–100 microns and most preferably, about 5–80 microns.

Utility

The particles of this invention are useful as powder coatings.

The particles can be applied to a substrate by any suitable method. Suitable methods include spraying and the use of a fluidized bed. If desired, the particles and the substrate can be given an electrostatic charge so that they will adhere well to the substrate.

After the substrate has been coated with the particles, it is baked at a high enough temperature and for a sufficient time to cause the particles to coalesce, flow-out and polymer (A) and polymer (B) to react with each other. In such a manner, thermoplastic coatings are obtained from a thermoplastic powder coating composition through a condensation reaction taking place on the surface of the substrate. The thermoplastic coatings so obtained are suitable in applications requiring subsequent reflow, such as spot repairing. Often the temperature will be about 140°–275° C. and the time will be about 10 seconds to 60 minutes for the reaction.

The particles can be used for coating any suitable substrate such as metals including automobile bodies, wires, cans, coils, etc., ceramic, etc.

The following examples illustrate the invention.

EXAMPLE 1

Epoxy containing polymers were made by placing 400 grams methyl methacrylate, 133 grams n-butyl methacrylate, 16.5 grams glycidyl methacrylate, 60 grams methylethyl ketone and 200 grams toluene in a 3000-ml flask equipped with a stirrer, condenser, and dropping funnel. The contents were heated to reflux (~97° C.), a solution of 5 grams benzoyl peroxide, 3.5 grams lauryl mercaptan and 20 grams methyl ethyl ketone was added and reflux maintained for 30 minutes. A mixture of 400 grams methyl methacrylate, 133 grams n-butyl methacrylate, 16.5 grams glycidyl methacrylate, 110 grams methylethyl ketone, 5.0 grams benzoyl peroxide, 3.5 grams lauryl mercaptan, and 320 grams toluene was then added dropwise over 90 minutes. Reflux was maintained for another 30 minutes before a solution of 1 gram benzoyl peroxide in 30 grams toluene was added. Heating was continued for another 30 minutes to complete the reaction. The resulting polymer had a weight average molecular weight of about 70,000, an average of about 4 epoxy groups per molecule and a glass transition point of about 80° C.

Monofunctional acid polymers were made by using difunctional initiator and difunctional chain transfer agent. 450 grams of methyl methacrylate, 150 grams of n-butyl methacrylate, 250 grams toluene, and 60 grams methylethyl ketone were placed in a 3000-ml flask equipped with a stirrer, condenser, and dropping funnel. A solution of 0.8 gram 4.4'-azobis-(α-cyanovaleric acid) and 4.5 grams mercaptobenzoic acid in 30 grams acetone was added and the mixture refluxed for 30 minutes. A solution containing 450 grams methyl methacrylate 150 grams n-butyl methacrylate, 250 grams toluene, 60 grams methylethyl ketone, 70 grams acetone, 0.8 gram 4.4'-azobis-(α-cyanovaleric acid), and 4.5 grams mercaptobenzoic acid were then dripped in over 90 minutes. After an additional 30 minutes reflux 0.5 gram of 4,4'-azobis-(α-cyanovaleric acid) in 30 grams of acetone was added. Reflux was maintained for another 30 minutes to complete the reaction. The resulting polymer had a weight average molecular weight of about 60,000, an average of about 1 acid group per molecule and a glass transition point of about 80° C.

Next, two moles of the above acid containing polymer and one mole of the epoxy containing polymer were admixed and spray dried to produce particles of a blend of the polymers having an average particle size of about 5–100 microns.

The particles were then sprayed on a metal panel and baked for about 40 minutes at 175°0 C.

The resulting baked paint film had an excellent smooth, shiney appearance which indicated excellent coalescence, flow-out and leveling of the polymer particles.

EXAMPLE 2

Example 1 was repeated with the exception that the mercaptobenzoic acid was replaced with mercapto acetic acid. Equally desirable results were obtained.

EXAMPLE 3

The foregoing examples can be repeated with the exception that the epoxy containing polymer can be replaced with an aziridinyl containing polymer. This aziridinyl containing polymer can be produced by using the same technique that was used to produce the epoxy containing polymer of Example 1 with the exception that the glycidyl methacrylate can be replaced with 2-aziridinyl ethyl methacrylate.

What is claimed is:

1. A thermoplastic powder coating composition for coating substrates comprising particles of polymeric material consisting essentially of a mixture of polymer (A) and polymer (B), polymer (A) and polymer (B) being a polymer of ethylenically unsaturated monomers and having reactive groups, the reactive groups on polymer (A) being coreactive in a condensation reaction with the reactive groups on polymer (B) and said reaction taking place on the substrate to which the powder coating composition is applied to form a thermoplastic coating on the substrate of a condensation polymer having a weight average molecular weight of 40,000–200,000;

wherein said particles have an average diameter of about 5–300 microns; wherein said polymer (A) and polymer (B) have a glass transition temperature of about 45°–115° C., a weight average molecular weight of about 5,000–180,000; wherein said polymer (A) and polymer (B) are compatible as indicated by the miscibility of their solutions; wherein said reactive groups are selected from the class consisting essentially of carboxyl, acid chloride, isocyanato, amino, hydroxyl, epoxy, and aziridinyl groups, and wherein the product of said condensation reaction has a weight average molecular weight of about 40,000–200,000;

wherein there is presennt a sufficient number of equivalents of either of polymer (A) or polymer (B) that contains an average of about 0.9–1.1 reactive groups per molecule to react with at least about 50% of the reactive groups on the other of polymer (A) or polymer (B) that contains an average of at least one reactive group per molecule, and wherein polymer (A) and polymer (B) are formed from unsaturated monomers selected from at least one of esters of acrylic acid or methacrylic acid with alkanols of $C_1$–$C_{18}$, amides of acrylic or methacrylic acid, nitriles of acrylic acid or methacrylic acid, styrene, $C_1$–$C_6$ alkyl styrenes, vinyl esters of fatty acids having 2–20 arbon atoms, vinyl chloride,

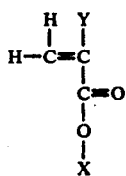

wherein Y=—H, —CH₃ or —CH₂CH₃ and

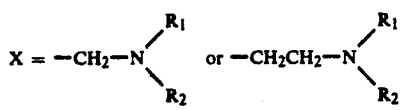

wherein $R_1$ and $R_2$ are H or $C_1$–$C_4$ alkyl and one of acrylic acid, methacrylic acid, itaconic acid, maleic anhydride, crotonic acid, allyl alcohol, hydroxyethyl acrylate, hydroxypropyl acrylate, hydroxyethyl methacrylate, hydroxypropyl methacrylate, vinyl alcohol, 2-isocyanato ethyl methacrylate, glycidyl methacrylate aziridinyl methacrylate, methacryl chloride, and ethacryl chloride in each of polymer (A) and polymer (B), such that the reactive groups on polymer (A) are coreactive in a condensation reaction with the reactive groups on polymer (B).

2. The composition of claim 1 wherein the particles contain pigment in an amount of about 0.5–60% by volume based on the combined volume of the pigment and polymer (A) and polymer (B).

3. The composition of claim 2 wherein polymer (A) and polymer (B) are formed from:
 (a) at least one of esters of acrylic acid or methacrylic acid with alkanols of $C_1$–$C_{18}$; and
 (b) one of acrylic acid, methacrylic acid, hydroxyethyl acrylate, hydroxypropyl acrylate, hydroxyethyl methacrylate, hydroxypropyl methacrylate, and glycidyl methacrylate in each of polymer (A) and polymer (B), such that the reactive groups on polymer (A) are coreactive in a condensation reaction with the reactive groups on polymers (B);
and wherein the monomers under (a) are substantially the same, and are present in substantially the same proportions, in both polymer (A) and polymer (B).

* * * * *